US008799656B2

(12) United States Patent
Brickell et al.

(10) Patent No.: US 8,799,656 B2
(45) Date of Patent: Aug. 5, 2014

(54) METHODS FOR ANONYMOUS AUTHENTICATION AND KEY AGREEMENT

(75) Inventors: Ernest F. Brickell, Hillsboro, OR (US); Jiangtao Li, Beaverton, OR (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 12/913,708

(22) Filed: Oct. 27, 2010

(65) Prior Publication Data

US 2012/0023334 A1 Jan. 26, 2012

Related U.S. Application Data

(60) Provisional application No. 61/367,726, filed on Jul. 26, 2010.

(51) Int. Cl.
*H04L 9/32* (2006.01)
*H04L 12/06* (2006.01)

(52) U.S. Cl.
USPC ........... 713/169; 713/155; 713/158; 713/176; 713/189; 713/190; 380/282

(58) Field of Classification Search
USPC .......................................................... 713/169
See application file for complete search history.

(56) References Cited

U.S. PATENT DOCUMENTS

| | | | | |
|---|---|---|---|---|
| 2005/0166051 A1* | 7/2005 | Buer | | 713/173 |
| 2005/0289347 A1* | 12/2005 | Ovadia | | 713/171 |
| 2006/0010079 A1* | 1/2006 | Brickell | | 705/67 |
| 2006/0117181 A1* | 6/2006 | Brickell | | 713/176 |
| 2008/0095361 A1* | 4/2008 | Wifvesson et al. | | 380/44 |
| 2008/0095371 A1* | 4/2008 | Vataja | | 380/278 |
| 2008/0270790 A1* | 10/2008 | Brickell et al. | | 713/158 |
| 2008/0307223 A1* | 12/2008 | Brickell et al. | | 713/158 |
| 2009/0049300 A1* | 2/2009 | Camenisch | | 713/176 |
| 2009/0129600 A1* | 5/2009 | Brickell et al. | | 380/282 |
| 2009/0210716 A1* | 8/2009 | Chen | | 713/176 |
| 2009/0307493 A1* | 12/2009 | Smith | | 713/170 |
| 2009/0319434 A1* | 12/2009 | Camenisch | | 705/75 |
| 2010/0042839 A1* | 2/2010 | Ho | | 713/169 |
| 2010/0161956 A1* | 6/2010 | Rasheed et al. | | 713/150 |

OTHER PUBLICATIONS

Liqun Chen, Dan Page, Nigel Smart, On the Design and Implementation of an Efficient DAA Scheme. Smart Card Research and Advanced Application Conference—CARDIS 2010, pp. 223-237. Apr. 2010.*
Brickell, et al., "Direct Anonymous Attestation," http://eprint.iacr.org/2004/205.pdf, Feb. 11, 2004, 28 pages.
Walker, et al., "Key Exchange with Anonymous Authentication Using DAA-SIGMA Protocol," http://eprint.iacr.org/2010/454, Aug. 22, 2010, 21 pages.

(Continued)

*Primary Examiner* — Andrew Goldberg
*Assistant Examiner* — Gary Gracia
(74) *Attorney, Agent, or Firm* — Blakely, Sokoloff, Taylor & Zafman LLP

(57) ABSTRACT

Methods for anonymous authentication and key exchange are presented. In one embodiment, a method includes initiating a two-way mutual authentication between a device and a remote entity. The device remains anonymous to the remote entity after performing the authentication. The method also includes establishing a mutually shared session key for use in secure communication, wherein the initiating and the establishing are in conjunction with direct anonymous attestation (DAA).

20 Claims, 7 Drawing Sheets

(56) References Cited

OTHER PUBLICATIONS

International Search Report and Written Opinion for International Patent Application No. PCT/US2011/044733, Mailed Feb. 9, 2012.

Menezes, et al., "Handbook of Applied Cryptography", CRC Press, 1997, pp. 515-517.

* cited by examiner

METHODS FOR ANONYMOUS AUTHENTICATION AND KEY AGREEMENT

CROSS-REFERENCE TO RELATED APPLICATIONS

This application claims the benefit of U.S. Provisional Application No. 61/367,726, filed on Jul. 26, 2010, which is incorporated herein by reference as if set forth herein in full.

FIELD OF THE INVENTION

Embodiments of the invention relate to the field of cryptography, more particularly, relate to direct anonymous attestation.

BACKGROUND OF THE INVENTION

The objective of direct anonymous attestation (DAA) is to enable a party to prove that the party is a member in good standing in a group without revealing information about its identity. In the DAA scheme, there are three types of entities: an issuer, a prover, and verifiers.

An issuer is an entity that issues a unique DAA private key to each member of the group. A verifier is an entity which is trying to establish whether the platform is a member of the group. A platform is an entity which is trying to prove membership in the group. If the platform is indeed a member in the group in good standing (i.e., the platform owns a valid DAA private key and the private key has not been revoked), the authentication process will be successful.

For each DAA group, there is a group public key and a group issuing private key (master key). The group issuing private key is used for generating a unique private key for each group member. The issuing private key is kept securely by the issuer. Each platform uses its DAA private key to digitally sign a message. The resulting signature is referred to as a DAA signature. The verifier uses the group public key to verify the correctness of a DAA signature, i.e., to verify that the signature was indeed created by a platform with a valid DAA private key. The DAA signature however does not reveal any information about which unique private key was used to create the DAA signature. The DAA scheme includes methods to handle revocation, such as, for example, a private-key based revocation and a signature based revocation. DAA scheme does not include generating mutual shared session keys.

The SIGMA (SIGn-and-MAc Approach) protocol is a Diffie-Hellman based key exchange protocol using digital signatures. The protocol is used by the Internet Key Exchange (IKE) standards and IPsec standards.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
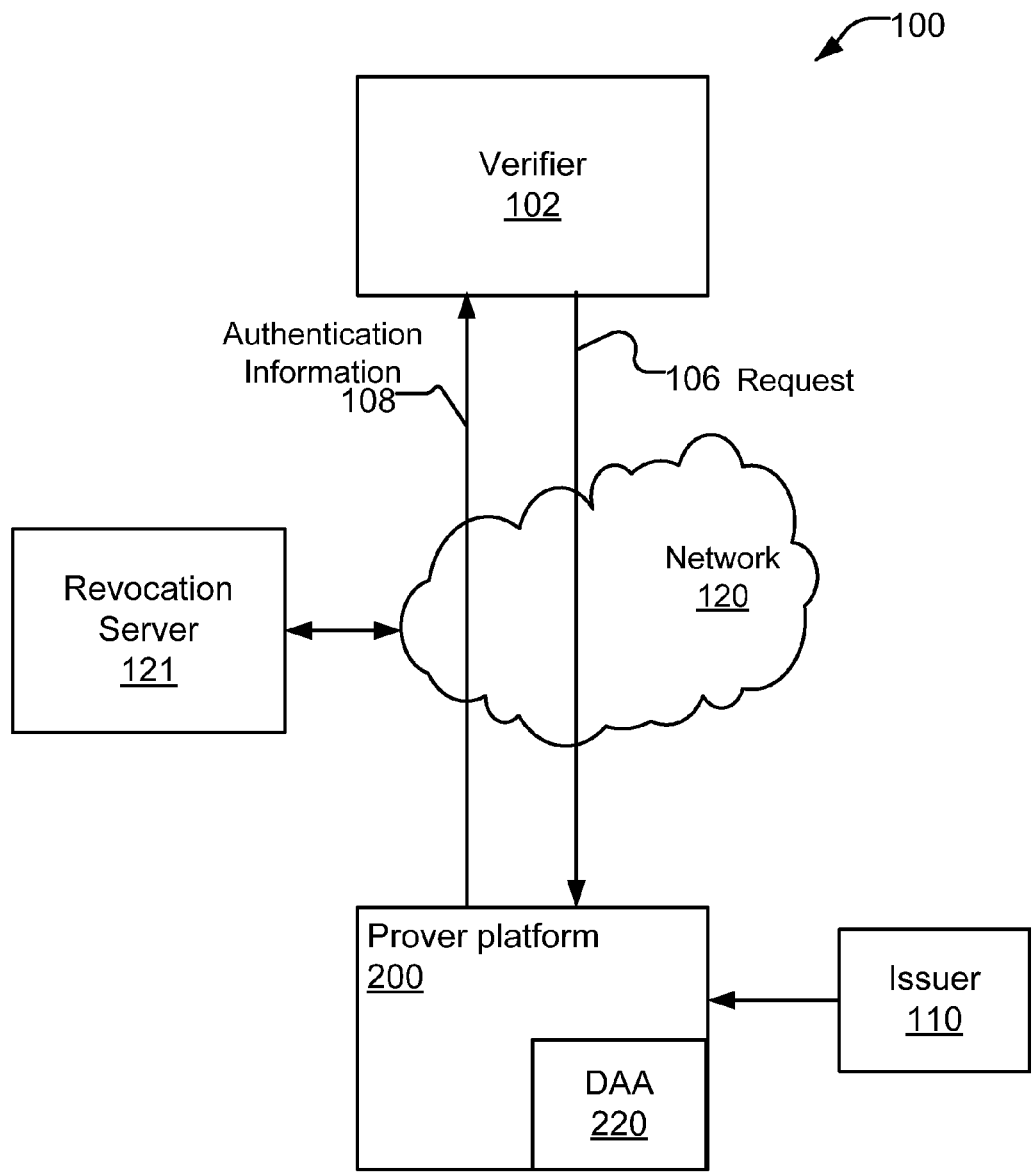
FIG. 1 is a system featuring a platform implemented with a DAA module in accordance with one embodiment of the invention.

Methods for anonymous authentication and key exchange are presented. In one embodiment, a method includes initiating a two-way mutual authentication between a device and a remote entity. The device remains anonymous to the remote entity after performing the authentication. The method also includes establishing a mutually shared session key for use in secure communication, wherein the initiating and the establishing are in conjunction with direct anonymous attestation (DAA).

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following description, certain terminology is used to describe certain features of one or more embodiments of the invention. For instance, "platform" is defined as any type of communication device that is adapted to transmit and receive information. Examples of various platforms include, but are not limited or restricted to computers, personal digital assistants, cellular telephones, set-top boxes, facsimile machines, printers, modems, routers, smart cards or other like form factor device including an integrated circuit, or other like device such as a bank card, credit card, identification card and the like including logic to perform enhanced revocation according to any one of the described embodiments. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for anonymous authentication and a key exchange. Specifically, the method and apparatus described herein are primarily discussed in reference to multi-core processor computer systems. However, the methods and apparatus for anonymous authentication and a key exchange are not so limited, as they may be implemented on or in association with any integrated circuit device or system, such as cell phones, personal digital assistants, embedded controllers, mobile platforms, desktop platforms, and server platforms, as well as in conjunction with other resources.

Overview

Methods for anonymous authentication and key exchange are presented. In one embodiment, a method includes initiating a two-way mutual authentication between a device and a remote entity. The device remains anonymous to the remote entity after performing the authentication. The method also includes establishing a mutually shared session key for use in secure communication, wherein the initiating and the establishing are in conjunction with direct anonymous attestation (DAA).

In one embodiment, a "verifier" is an entity (e.g., person, platform, system, and/or device) that requests some verification of authenticity or authority from another entity. Normally, this is performed prior to disclosing or providing the requested information. A "prover" is an entity that is requested to provide some proof of its authority, validity, and/or identity. An "issuer" organizes or manages a trusted membership group and engages with hardware devices to join the trusted membership group. A "device manufacturer," which may be used interchangeably with "certifying manufacturer," is any entity that manufactures or configures a platform or a device (e.g., a Trusted Platform Module). An issuer may be a device/certifying manufacturer.

FIG. 1 is a system featuring a platform implemented with a DAA module in accordance with one embodiment of the invention. Many related components such as buses and peripherals have not been shown to avoid obscuring the invention. Referring to FIG. 1, the system includes verifier 102, prover platform 200, DAA 220, issuer 110, revocation server 121, and network 120. In one embodiment, verifier 102 receives request 106 from prover platform 200 and sends authentication information 108 to prover platform 200.

In one embodiment, a trusted platform module is a trusted hardware device. DAA 220 is a part of the trusted platform module (TPM). In another embodiment, DAA 220 is a module independent from the TPM. Verifier 102 (e.g., a first platform) transmits authentication request 106 to prover platform 200 (e.g., a second platform) via network 120. In response to request 106, prover platform 200 provides authentication information 108. In one embodiment, network 120 forms part of a local or wide area network, a conventional network infrastructure, or any combinations thereof, such as a company's Intranet, the Internet, or other like network.

In one embodiment, for heightened security, verifier 102 verifies whether that prover platform 200 is manufactured by a selected device manufacturer or a selected group of device manufacturers (hereinafter referred to as "device manufacturers"). In one embodiment, verifier 102 challenges prover platform 200 to show that prover platform 200 has cryptographic information (e.g., a private member key) generated by issuer 110. Prover platform 200 replies to the challenge by providing authentication information 108, in the form of a reply, to convince verifier platform 102 that prover platform 200 has cryptographic information generated by issuer 110, without revealing the cryptographic information or any unique, device/platform identification information also referred to herein as "unique, device identification information" to enable a trusted member device to remain anonymous to the verifier.

In one embodiment, functionality of DAA 220, which is configured to prove to verifier 102 that information (e.g., cryptographic key, digital signature, digital certificate, etc.) from DAA 220 is uncompromised, is deployed as firmware. However, it is contemplated that such functionality may be deployed as dedicated hardware, software, or the combination thereof. Instructions or code forming the firmware or software are stored on a machine-readable medium. As described herein, DAA is a scheme that enables remote authentication of DAA 220, while preserving the privacy of the user of the platform that contains DAA 220.

Figure 2:
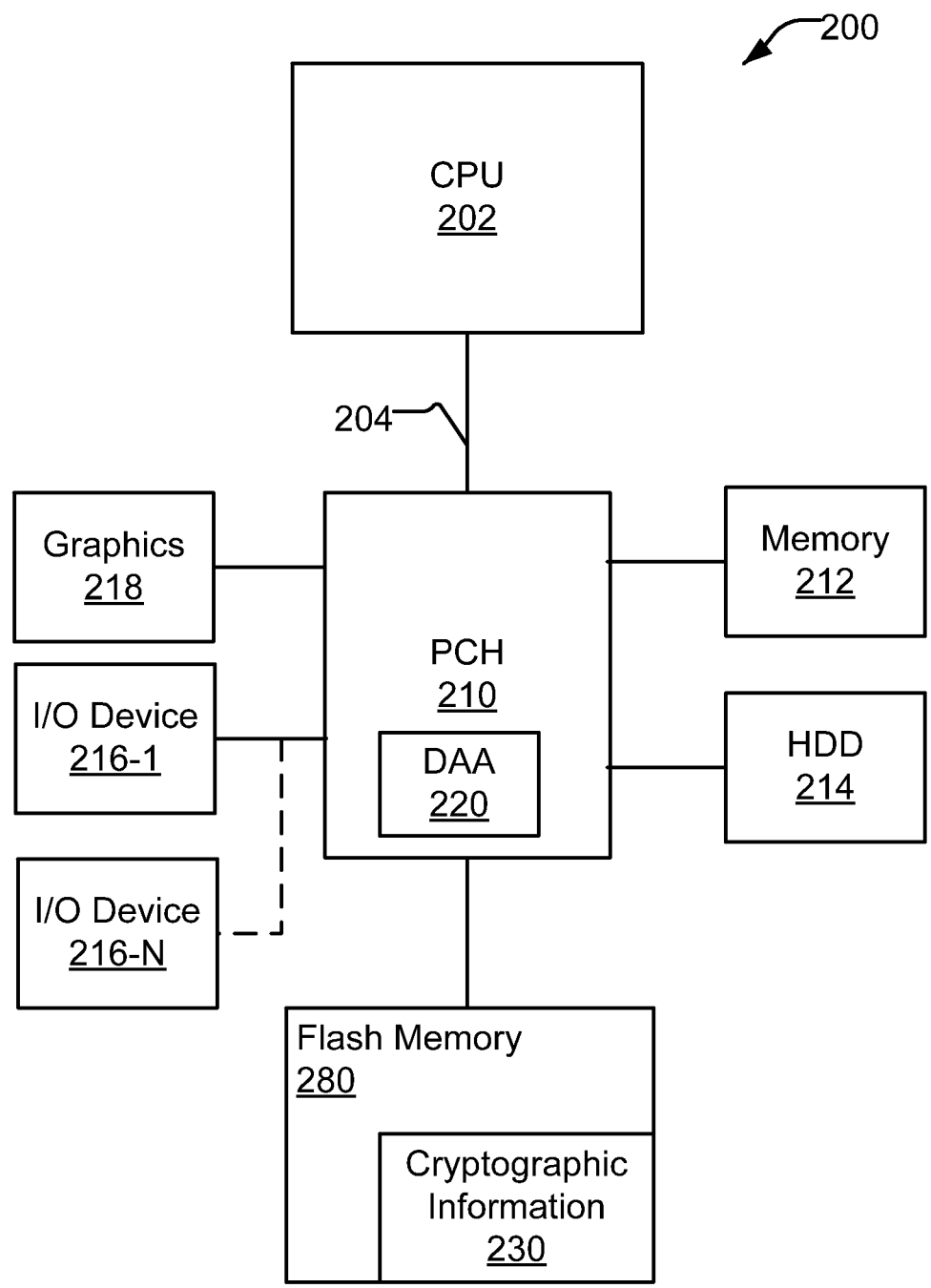
FIG. 2 shows an embodiment of the platform including the DAA module with respect to FIG. 1.

FIG. 2 shows an embodiment of the platform including a DAA module with respect to FIG. 1. Many related components such as buses and peripherals have not been shown to avoid obscuring the invention. Referring to FIG. 2, the platform includes CPU 202, PCH (platform controller hub) 210, DAA 220, memory 212, Hard disk (HDD) 214, graphic engines 218, flash memory 280, I/O device 216-1, and one or more I/O devices 216-N. In one embodiment, flash memory 280 stores cryptographic information 230.

In one embodiment, platform 200 includes DAA 220 to convince a verifier that platform 200 possesses uncompromised cryptographic information without disclosure of the cryptographic information or any unique device identification information. In one embodiment, DAA 220 includes a unique group membership certificate and a private member key to provide a private signature. In one embodiment, DAA 220 in combination with platform 200 generates authentication information using private unique signature key 230 to prove to a verifier that platform 200 is a member of a trusted membership group defined by an issuer (e.g., device manufacturer), without disclosure of any unique device identification information including the private signature key. This enables trusted platform 200 to remain anonymous to a verifier. As described herein, cryptographic information 230 may be alternatively referred to as a private member key/private signature key. Representatively, computer system 200 comprises link 204 for communicating information between processor (CPU) 202 and PCH 210. As described herein, PCH 210 or chipset describe the various devices coupled to CPU 202 to perform desired system functionality.

In one embodiment, graphic engines 218, HDD 214, and main memory 212 are coupled to PCH 210. In one embodiment, PCH 210 is configured to include a memory controller, an input/output (I/O) controller, or both to communicate with I/O devices 216 (216-1, . . . , 216-N). In one embodiment, PCH 210 is configured to incorporate graphics engines 218 and operates as a graphics memory controller hub (GMCH). In one embodiment, main memory 212 includes, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM), or any device capable of supporting high-speed buffering of data.

DAA-SIGMA Protocol

Figure 3:
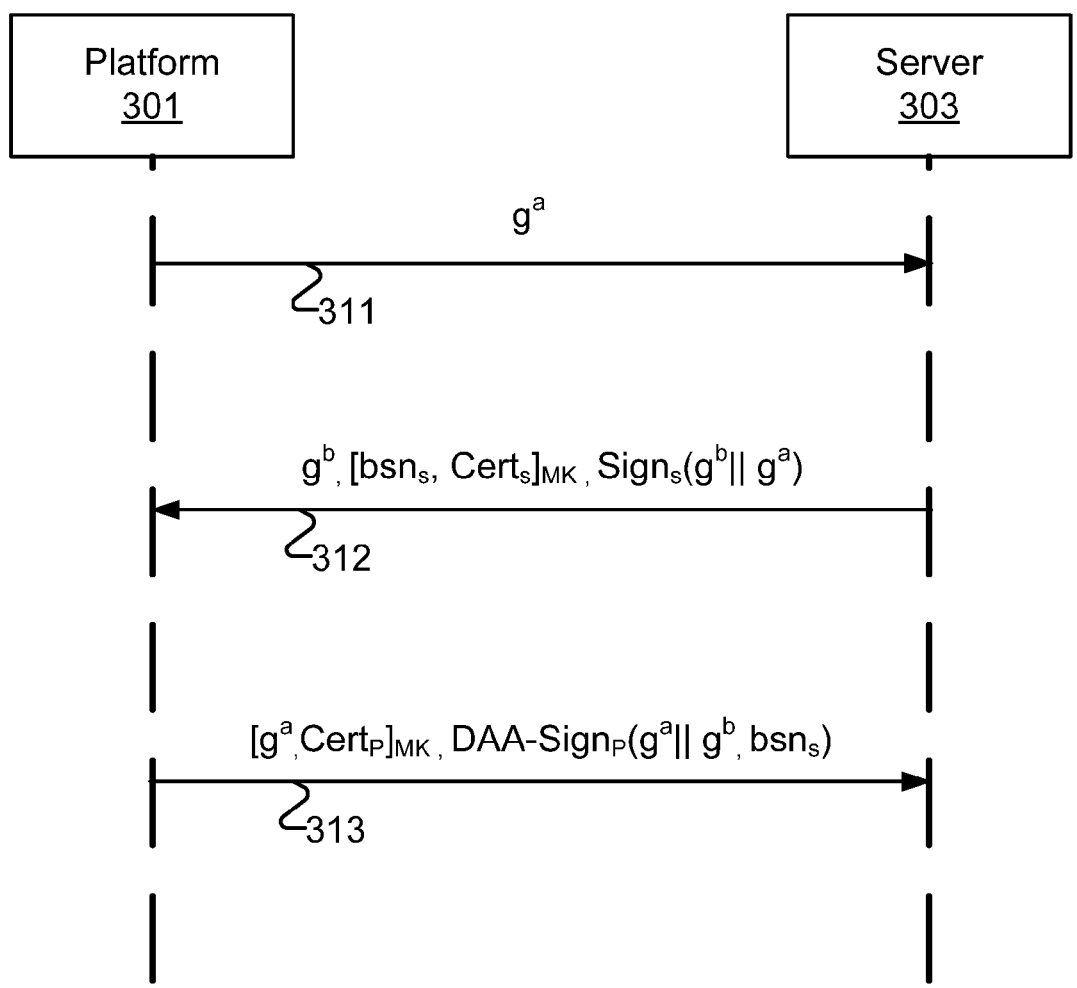
FIG. 3 shows a flow diagram of one embodiment of a process to perform authentication and to establish a shared key.

FIG. 3 shows a flow diagram of one embodiment of a process to perform authentication and to establish a shared key. The process is performed by processing logic that may comprise hardware (circuitry, dedicated logic, etc.), software (such as one that is run on a general purpose computer system or a dedicated machine), or a combination of both. In one embodiment, the process is performed in conjunction with a system (e.g., the system with respect to FIG. 1). In one embodiment, the process is performed by platform 301 and server 303.

Figure 4:
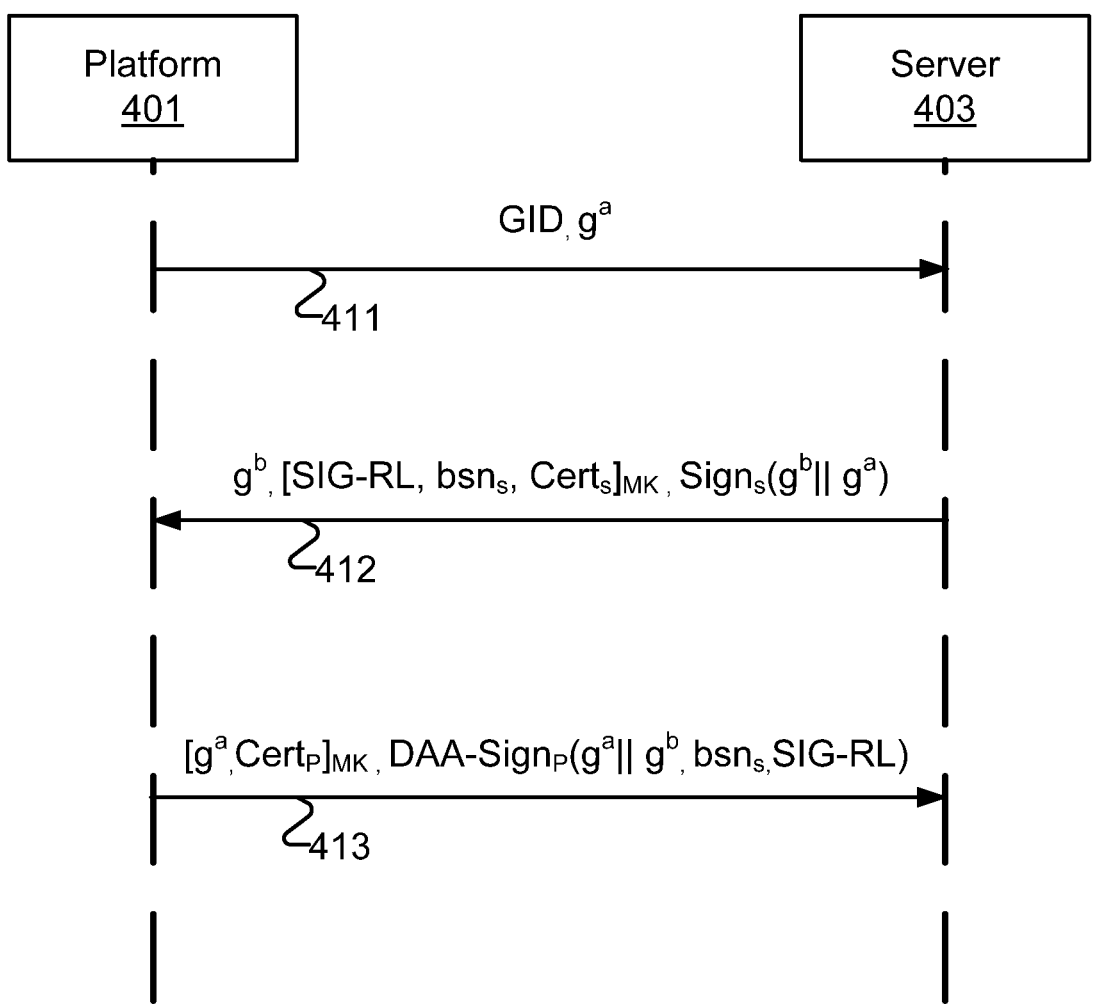
FIG. 4 shows a flow diagram of one embodiment of a process for signature based revocation.
Figure 5:
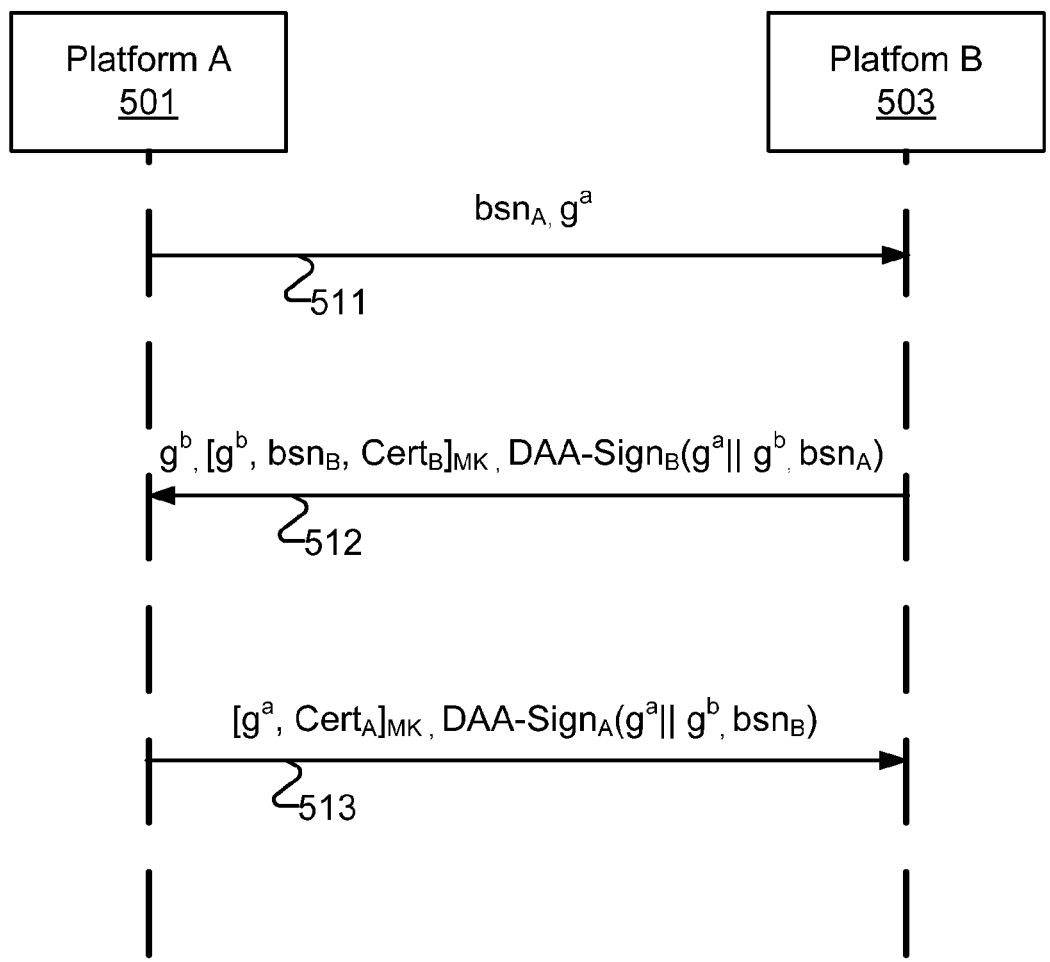
FIG. 5 shows a flow diagram of one embodiment of a process to perform bilateral anonymous authentication.

In one embodiment, the notations in Table 1 are used to describe FIGS. 3-5. In one embodiment, as described below, bsn and SIG-RL are optional inputs.

TABLE 1

Notations (M)$_k$: This denotes an encryption of message M using key k (in conjunction with key k).
[M]$_k$: This denotes a message M concatenated with a Message Authentication Code (MAC) of message M. The MAC is computed using key k (in conjunction with key k).
Sign$_A$(M): This denotes a digital signature of M computed in conjunction with the entity A's private key.
DAA-Sign$_A$(M, bsn, SIG-RL): This denotes a DAA signature of message M computed using the entity A's DAA private key, where bsn is the verifier's basename and SIG-RL is the signature based revocation list. Both bsn and SIG-RL are optional inputs.
Cert$_s$: This denotes a server's certificate.
Cert$_P$: This denotes a platform's DAA group certificate with which DAA group public key is derivable. A public key certification of P issued by a certificate authority (CA) to certify the group public key (gpk)

TABLE 1-continued

Notations a∥b: denotes a string concatenation operation involving "a" and "b", or more generically a result by combining "a" and "b"
PRF($g^{ab}$): denotes generating a value using a pseudo-random function in conjunction with $g^{ab}$.

In one embodiment, a DAA-SIGMA protocol is performed between a platform (e.g., platform 301) and server (e.g., server 303). Platform 301 owns a unique DAA private key and an associated DAA group certificate. Server 303 has a public-private key pair and a certificate. This protocol is performed in conjunction with a Diffie-Hellman (DH) based protocol with signature and MAC for authentication. The objective of performing the process is for mutual authentication between platform 301 and server 303 and to establish a shared key between both parties. In one embodiment, platform 301 authenticates to server 303 anonymously.

In one embodiment, the process begins by platform 301 sending message 1 to server 303 (process block 311).

In one embodiment, platform 301 chooses a random value "a" as the ephemeral DH private key. The platform computes $g^a$ as the ephemeral DH public key. The platform sends $g^a$ to the server in message 1.

In one embodiment, server 303 prepares sending Message 2 to platform 301 (process block 312).

In one embodiment, server 303 chooses a random value "b" as its ephemeral DH private key. Server 303 computes $g^b$ as its ephemeral DH public key. Server 303 computes $g^{ab}=(g^a)^b$. Server 303 securely erases b. Server 303 computes SK∥MK=PRF($g^{ab}$), where PRF is a pseudo-random function. SK is a session key and MK is a MAC key. Server 303 computes a MAC of (based on) bsn$_s$ and Cert$_s$ using MK as a key. In one embodiment, bsn$_s$ is either the basename of server 303 or a special symbol "⊥". In one embodiment, server 303 signs ($g^b$, $g^a$) using its private key (a signing key) and generates Sign$_s$($g^b$∥$g^a$). Accordingly, server 303 sends Message 2 comprising: $g^b$, [bsn$_s$, Cert$_s$]$_{MK}$, and Sign$_s$($g^b$∥$g^a$) to platform 301.

In one embodiment, platform 301, in response to receiving Message 2, verifies Message 2.

In one embodiment, platform 301 computes $g^{ab}=(g^b)^a$. Platform 301 securely erases "a". Platform 301 computes SK∥MK=PRF($g^{ab}$). Platform 301 verifies server 303's public key certificate Cert$_s$. Platform 301 verifies the MAC of bsn$_s$ and Cert$_s$ by using MK (i.e., the MAC key). Platform 301 verifies the signature of ($g^b$, $g^a$) by using server 303's public key which is retrievable from Cert$_s$. In one embodiment, if any of the above MAC verification, certificate verification, or signature verification fails, platform 301 aborts the protocol.

In one embodiment, platform 301 prepares sending Message 3 to server 303 (process block 313).

In one embodiment, platform 301 computes a MAC of its DAA group certificate using MK and produces [$g^a$, Cert$_P$]$_{MK}$. Platform 301 uses its DAA private key and bsn$_s$ (optional) to sign ($g^a$∥$g^b$) and produces DAA-Sign$_P$($g^a$∥$g^b$, bsn$_s$). Accordingly, platform 301 sends [$g^a$, Cert$_P$]$_{MK}$ and DAA-Sign$_P$ ($g^a$∥$g^b$, bsn$_s$) in Message 3 to server 303.

In one embodiment, server 303, in response to receiving the Message 3, verifies Message 3.

In one embodiment, server 303 verifies [$g^a$, Cert$_P$]$_{MK}$ using MK (the MAC key). Server 303 verifies the DAA group certificate [$g^a$, Cert$_P$]. Server 303 verifies the DAA signature of ($g^a$, $g^b$) using the DAA public key (derived from Cert$_P$) and the basename bsn$_s$. In one embodiment, if bsn$_s$ is used in the protocol, the authentication is anonymous but linkable authentication. If $bsn_S$ is not used, the authentication is an anonymous authentication.

In one embodiment, two options are available for generating a DAA signature, such as, for example, a random based option and a name-based option. In random based option (i.e., the basename is a special symbol "⊥"), the DAA signature is anonymous and non-linkable. In name based option, a verifier sends its basename to platform 301, and platform 301 creates a DAA signature based in part on the basename of the verifier.

In one embodiment, platform 301 and server 303 have established a shared session key SK. Both parties are able to use SK for secure and authenticated communication between them.

In one embodiment, platform 301 has been provisioned with a unique Direct Anonymous Attestation (DAA) key. In one embodiment, for example, DAA is implemented in conjunction with Intel® Enhanced Privacy ID (EPID).

In one embodiment, platform 301 is to mutually authenticate with a service provider and to establish a session key for future secure communication. The service provider authenticates to platform 301 using traditional PKI certificate, whereas platform 301 authenticates (itself) to the service provider anonymously using DAA-SIGMA. In one embodiment, platform 301 anonymously authenticates to a verifier in a secure handshake protocol and derives a shared session key for future secure communication.

In one embodiment, the process begins by initiating a two-way mutual authentication between a device and a remote entity. The device remains anonymous to the remote entity after performing the authentication. The parties establish a mutually shared session key for use in secure communication. The initiating and the establishing are in conjunction with direct anonymous attestation (DAA).

Platform Role

In one embodiment, processing logic (e.g., platform 301) selects a random value (e.g., DH private key) and sends a first message comprising at least a key-exchange-protocol public key (e.g., DH public key) computed based on the random value. Processing logic computes, in response to receiving a second message, a shared value (e.g., $g^a$, $g^b$) based on the random value and a key-exchange-protocol public key associated with the remote entity. Processing logic generates a session key and a message authentication code (MAC) key based at least on the shared value (e.g. $g^{ab}$). Processing logic verifies, using the MAC key (e.g., MK), a public key certificate associated with a remote entity. Processing logic authenticates a digital signature from the second message based on combined public keys ($g^a\|g^b$) retrievable from the digital signature. The digital signature is associated with the remote entity and is retrievable using a public key from the public key certificate. Processing logic generates, using the MAC key, a MAC (e.g., $[Cert_P]_{MK}$) based on a DAA-based group certificate. Processing logic generates, using a DAA-based private key, a DAA-based signature based on the combined public keys. Processing logic sends a third message comprising at least the DAA-based signature and the MAC.

In one embodiment, processing logic detects whether there is a failure during MAC verification, signature verification, or certificate verification. Processing logic aborts the authentication if a failure is detected.

Verifier Role

In one embodiment, processing logic (e.g., server 303, a remote entity) receives a first message from a device with a request to perform mutual anonymous authentication.

In one embodiment, processing logic computes, based on a random value (e.g., "b"), a DH public key (e.g., $g^b$) associated with the remote entity. Processing logic computers a shared value (e.g., $g^{ab}$ or $g^a$, $g^b$) based on the random number and a DH public key associated with the device (the DH public key is retrievable from the first message). Processing logic securely erases the random value. Processing logic generates a session key and a message authentication code (MAC) key based at least on the shared value (e.g., $g^a$, $g^b$). Processing logic generates, using the MAC key, a MAC (e.g., $[bsn_S, Cert_S]_{MK}$) on a public key certificate associated with the remote entity. Processing logic generates, using a remote entity private key, a digital signature (e.g., $Sign_S(g^b\|g^a)$ based at least on combined public keys. The combined public keys include, for example, the DH public key associated with the remote entity and the DH public key associated with the device. Processing logic sends a second message comprising at least the digital signature and the MAC. Processing logic then receives a third message from the device. Processing logic verifies, using the MAC key, a DAA-based public key (e.g, $[Cert_P]$) retrievable from the third message. Processing logic verifies at least, using the DAA-based public key, a DAA-based signature (e.g., $DAA-Sign_P(g^a\|g^b, bsn_s)$ in the third message.

DAA-SIGMA Protocol with Signature Based Revocation

FIG. 4 shows a flow diagram of one embodiment of a process for signature based revocation. The process is performed by processing logic that may comprise hardware (circuitry, dedicated logic, etc.), software (such as one that is run on a general purpose computer system or a dedicated machine), or a combination of both. In one embodiment, the process is performed in conjunction with a system (e.g., the system with respect to FIG. 1). In one embodiment, the process is performed by platform 401 and server 403.

In one embodiment, in signature based revocation, an issuer revokes a platform based on the signature generated by the platform. This revocation method is used when a key becomes subject to revocation criteria but has not be exposed yet. In one embodiment, an issuer is able to revoke a platform by revoking the platform's signatures. The method is also known as signature based revocation. In such revocation, platform 401 needs to refer to (e.g., read) a revocation list (referred to herein as SIG-RL). Platform 401 produces a "non-revoked proof" along with the DAA signature. Server 403 reviews and determines whether or not to accept the "non-revoked proof". In one embodiment, for signature based revocation, both the platform and the verifier perform some computations to enable the verifier to perform its responsibility of checking whether the platform has been revoked according to SIG-RL.

In one embodiment, multiple DAA groups are present. Each DAA group is associated with a unique group ID and a group certificate.

In one embodiment, the process begins by platform 401 sending message 1 to server 403 (process block 411).

In one embodiment, platform 401 performs a protocol substantially similar to process block 311 with respect to FIG. 3. In addition to public key $g^a$, platform 401 includes DAA group ID "GID" in message 1 and sends message 1 to server 403. GID is used by a verifier to identity to which DAA group a platform belongs.

In one embodiment, server 403, in response to receiving the message 1, prepares to send message 2 (process block 412).

Server 403 obtains SIG-RL corresponding with GID. Server 403 computes a MAC (e.g., $[SIG-RL, bsn_S, Cert_S]_{MK}$) based on SIG-RL, $bsn_S$, and $Cert_S$ using MK (the MAC key). In one embodiment, server 403 performs a protocol substantially similar to process block 312 with respect to FIG. 3.

Accordingly, server 403 sends $g^b$, [SIG-RL, $bsn_S$, $Cert_S]_{MK}$, and $Sign_S(g^b\|g^a)$ to platform 401.

In one embodiment, platform 401 prepares to send message 3 to server 403 (process block 413).

In one embodiment, platform 401 generates (based on current DAA private key, SIG-RL, and $bsn_S$) a DAA signature (e.g., DAA-$Sign_P(g^a\|g^b$, $bsn_S$, SIG-RL)). In one embodiment, non-revoked proof is embedded in the DAA signature. Accordingly, platform 401 sends [$g^a$, $Cert_P]_{MK}$ and DAA-$Sign_P(g^a\|g^b$, $bsn_S$, SIG-RL) to server 403.

In one embodiment, server 403, in response to receiving message 3, verifies message 3. In one embodiment, server 403 verifies the DAA signature including the revocation check using SIG-RL.

In one embodiment, there are two operations performed to prove a membership in a membership scheme: (1) Sign and (2) Verify.

With respect to (1) sign process: a platform generates a DAA signature on a message using its private key, the verifier's basename, and the SIG-RL (if provided). The SIG-RL is given as input if the platform needs to conduct "zero-knowledge" proofs to prove that the platform has not been revoked on the SIG-RL The outputs of "non-revoked" proofs are part of the DAA signature.

With respect to the (2) verify process: a verifier verifies the correctness of a DAA signature using the group public key. The verifier also verifies that the creator of the DAA signature has not been revoked in PRIV-RL and SIG-RL.

In one embodiment, to control the size of the revocation lists (PRIV-RL or SIG-RL), an issuer creates multiple DAA groups. For example, suppose there are 10 million platforms. An issuer creates 100 DAA groups and each group has 100,000 group members. To issue a DAA private key for a platform, an issuer first chooses a DAA group for the platform, and then generates an DAA private key in that group. To conduct proof of membership, a platform needs to first reveal which DAA group the platform belongs to, and then proves that the platform is a valid member of that group.

In one embodiment, in private-key based revocation, an issuer revokes a platform based on the platform's private key. This revocation method is used when a platform's private key becomes exposed and subject to revocation criteria. PRIV-RL denotes the revocation list corresponding to the private-key based method. For private-key based revocation, a platform does not need to perform any action and it is the verifier's responsibility to check whether the platform has been revoked in PRIV-RL.

DAA-SIGMA Protocol with Bilateral Anonymous Authentication

FIG. 5 shows a flow diagram of one embodiment of a process to perform bilateral anonymous authentication. The process is performed by processing logic that may comprise hardware (circuitry, dedicated logic, etc.), software (such as one that is run on a general purpose computer system or a dedicated machine), or a combination of both. In one embodiment, the process is performed in conjunction with a system (e.g., the system with respect to FIG. 1). In one embodiment, the process in performed in conjunction with platform A 501 and platform B 503. In one embodiment, the process is performed by a computer system with respect to FIG. 7. In one embodiment, platform A 501 and platform B 503 are within a same platform, for example, as a processing core and a chipset.

In one embodiment, the process supports two-way anonymous authentication (bilaterally). Two platforms authenticate to each other anonymously and set up a secure channel by using a mutually shared session key generated during process. In one embodiment, platform B 503 is a remote entity or a second hardware platform.

In one embodiment, the process begins by platform 501 sending message 1 to platform B 503 (process block 511).

In one embodiment, platform A 501 chooses a random value "a" as its ephemeral DH private key. Platform A 501 computes an ephemeral DH public key (e.g., $g^a$). Platform A 501 sends $bsn_A$ and $g^a$ to platform B 503. In one embodiment, $bsn_A$ is either the basename of the platform A 501 or a symbol "$\perp$".

In one embodiment, platform B 503 sends message 2 to platform 503 (process block 512).

In one embodiment, platform B 503 chooses a random value "b" as its ephemeral DH private key. Platform B 503 computes $g^b$ as its ephemeral DH public key. Platform B 503 computes $g^{ab}=(g^a)^b$ and securely erases b. Platform B 503 computes SK$\|$MK=PRF($g^{ab}$). SK is the session key and MK is the MAC key. Platform B 503 computes a MAC based on $g^b$, $bsn_B$, and $Cert_B$ by using MK. In one embodiment, $bsn_B$ is either the basename of platform B 503 or a symbol "$\perp$". $Cert_B$ is platform B 503's DAA group certificate. Platform B 503 signs ($g^b$, $g^a$) in conjunction with its DAA private key and $bsn_A$ and produces DAA-$Sign_B(g^b\|g^a$, $bsn_A)$. Accordingly, platform B 503 sends $g^b$, [$g^b$, $bsn_B$, $Cert_B]_{MK}$, and DAA-$Sign_B(g^b\|g^a$, $bsn_A)$ to platform A 501.

In one embodiment, platform 501, in response to receiving the message 2, verifies message 2.

In one embodiment, platform A 501 computes $g^{ab}=(g^b)^a$ and securely erases "a". Platform A 501 computes SK$\|$MK=PRF($g^{ab}$). Platform A 501 verifies the platform B 503's group certificate $Cert_B$. Platform A 501 verifies the MAC (e.g., [$g^b$, $bsn_B$, $Cert_B]_{MK}$) of $bsn_B$ and $Cert_B$ by using the MAC key (i.e., MK). Platform A 501 verifies the DAA-$Sign_P(g^a\|g^b$, $bsn_A)$ using the group public key (retrievable in $Cert_B$) and basename $bsn_A$.

In one embodiment, platform A 501 prepares to send message 3 to platform B 503 (process block 513).

In one embodiment, platform A 501 computes a MAC of its DAA group certificate using MK. Platform A 501 produces [$g^a$, $Cert_A]_{MK}$. Platform A 501 uses its DAA private key and $bsn_B$ to sign ($g^a$, $g^b$) and produces DAA-$Sign_A(g^a\|g^b$, $bsn_B)$. Accordingly, platform A 501 sends [$g^a$, $Cert_A]_{MK}$, DAA-$Sign_A(g^a\|g^b$, $bsn_B)$ to platform B 503.

In one embodiment, platform B 503, in response to receiving the message 3, verifies message 3.

In one embodiment, platform B 503 verifies [$g^a$, $Cert_A]_{MK}$ using the MAC key, MK. Platform B 503 verifies the DAA group certificate $Cert_A$. Platform B 503 verifies the DAA signature of ($g^a$, $g^b$) using the DAA public key in $Cert_A$ and the basename $bsn_B$.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 6:
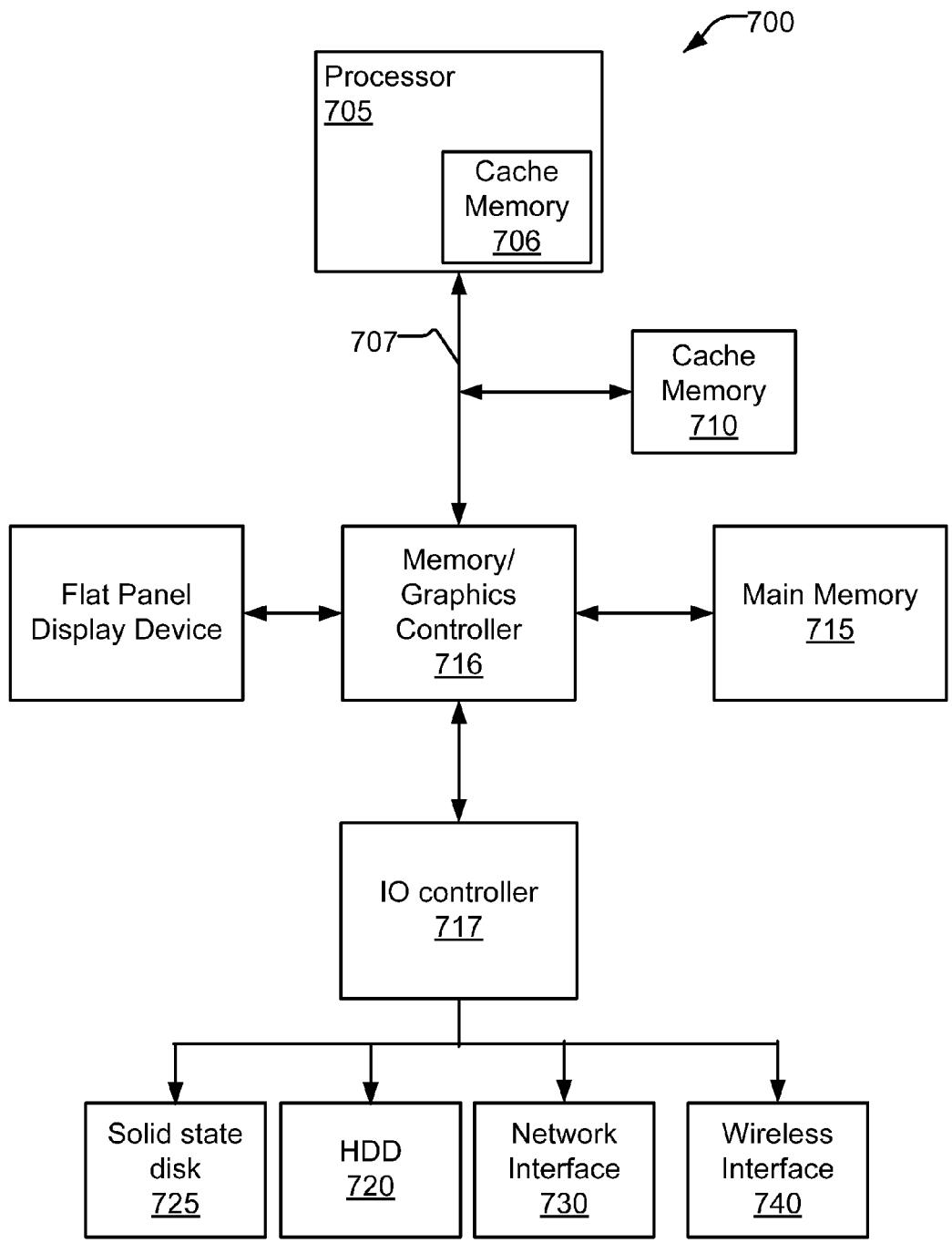
FIG. 6 illustrates a computer system for use with one embodiment of the present invention.

FIG. 6, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 6. Furthermore, other embodiments of the invention may be distributed throughout several circuits, logic units, or devices illustrated in FIG. 6.

Figure 7:
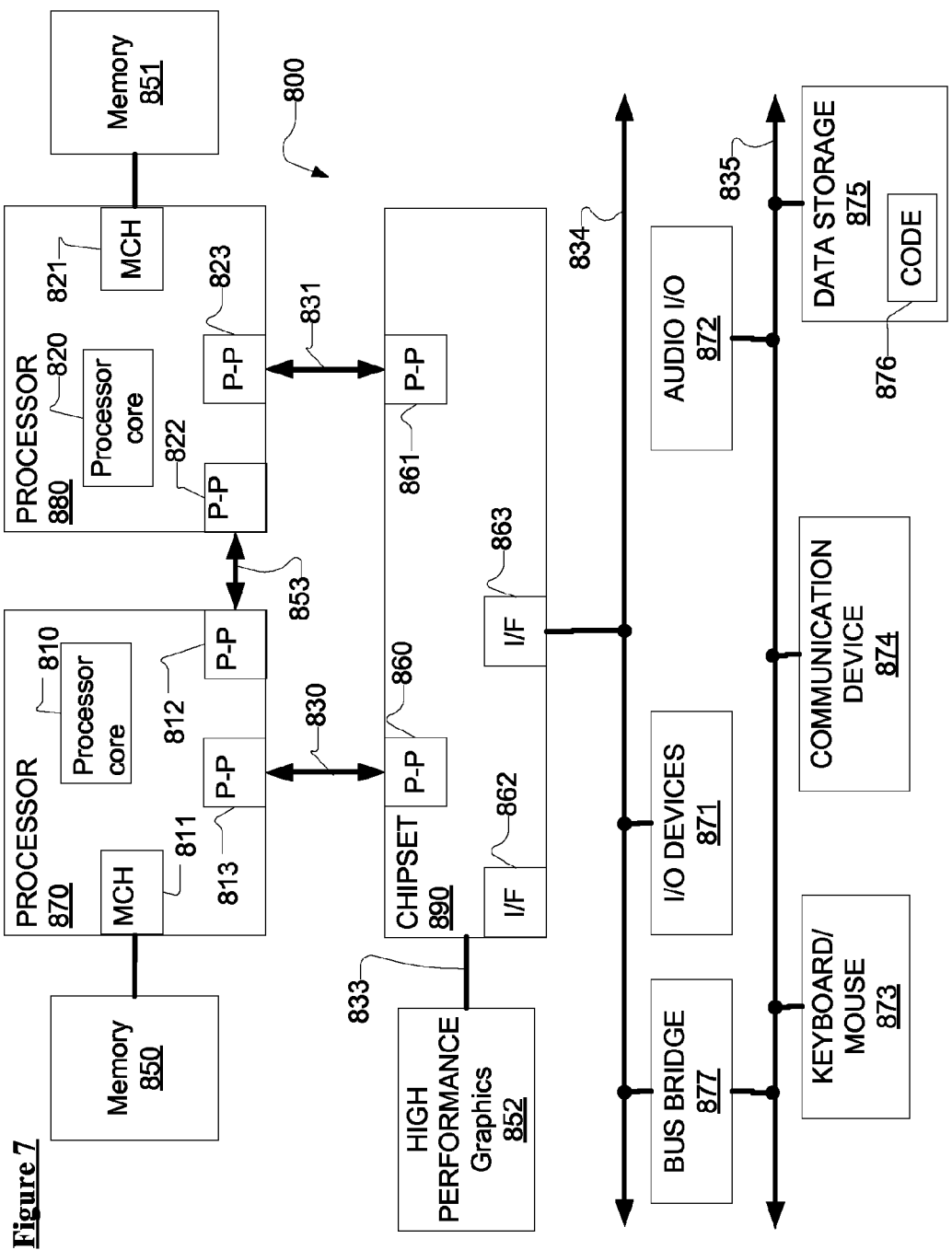
FIG. 7 illustrates a point-to-point computer system for use with one embodiment of the invention.

Similarly, at least one embodiment may be implemented within a point-to-point computer system. FIG. 7, for example, illustrates a computer system that is arranged in a point-to-point (PtP) configuration. In particular, FIG. 7 shows a system where processors, memory, and input/output devices are interconnected by a number of point-to-point interfaces.

The system of FIG. 7 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 7.

Other embodiments of the invention, however, may exist in other circuits, logic units, or devices within the system of FIG. 7. Furthermore, other embodiments of the invention may be distributed throughout several circuits, logic units, or devices illustrated in FIG. 7.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
    initiating a two-way mutual authentication between a first device and a remote entity, wherein the first device remains anonymous to the remote entity after performing the authentication;
    establishing a mutually shared session key based on random values from the first device and the remote entity for use in secure communication, wherein the initiating and the establishing are in conjunction with direct anonymous at-testation (DAA), wherein the DAA to convince a verifier that the DAA possess uncompromised cryptographic information from an issuer of a trusted membership group without disclosure of any unique identification information associated with the first device, wherein the DAA includes a unique group membership certificate and a private member key to provide a private unique signature key to prove authenticity of the first device to the verifier that the first device is a member of the trusted membership group without disclosing the unique identification information;
    sending a first message comprising at least a key-exchange-protocol public key computed based on a first random value, wherein the first random value is selected;
    generating a session key and a message authentication code (MAC) key based at least on a shared value, wherein the MAC key is used to verify a first public key certificate associated with the remote entity;
    verifying, by using the MAC key, a first public key certificate associated with the remote entity;
    computing, based on a random value, a DH public key associated with the remote entity;
    computing a shared value based on the random number and a DH public key associated with the first device retrievable from the first message;
    secure erasing, the random value; and
    generating, by using a remote entity private key, a first digital signature based at least on combined public keys, wherein the combined public keys include the DH public key associated with the remote entity and the DH public key associated with the first device; and
    sending a second message comprising at least the first digital signature and the MAC.

2. The method of claim 1, further comprising:
    computing, in response to receiving a second message, the shared value based on the first random value and a second key-exchange-protocol public key associated with the remote entity; and
    authenticating a first digital signature from the second message based on combined public keys retrievable from the first digital signature, wherein the first digital signature is associated with the remote entity and is retrievable by using a public key from the first public key certificate.

3. The method of claim 2, further comprising:
    generating, by using the MAC key, a MAC based at least on a DAA-based group certificate;
    generating, by using a DAA-based private key, a DAA-based signature based on the combined public keys; and sending a third message comprising at least the DAA-based signature and the MAC.

4. The method of claim 3, wherein the second message further includes a base-name associated with the remote entity and the DAA-based signature is generated further based on the basename, wherein the basename is a random based signature such that the remote entity remains anonymous and non-linkable.

5. The method of claim 3, further comprising:
detecting whether there is a failure during MAC verification, signature verification, or certificate verification; and aborting the authentication if a failure is detected.

6. The method of claim 3, wherein the remote entity is a server acting as a verifier, wherein the first message further includes a group ID (GID), wherein the DAA-based signature in the third message is generated further based on a signature-based revocation list and includes non-revoked proof.

7. The method of claim 3, wherein the remote entity is a second device, wherein the first message further includes a basename associated with the first device, wherein the first digital signature is a DAA-based signature generated by using a DAA-based private key associated with the second device.

8. The method of claim 3, wherein the first random value is an ephemeral Diffie-Hellman (DH) private key associated with the first device, wherein the key-exchange-protocol public key is the DH public key, wherein the session key and the MAC key are generated using a pseudo-random function.

9. A method comprising:
receiving, by a remote entity, a first message from a first device with a request to perform bilateral mutual anonymous authentication;
establishing a shared key for use in secure communication, wherein the receiving and the establishing are performed in conjunction with direct anonymous attestation (DAA), wherein the DAA to convince a verifier that the DAA possess uncompromised cryptographic information from an issuer of a trusted membership group without disclosure of any unique identification information associated with the first device, wherein the DAA includes a unique group membership certificate and a private member key to provide a private unique signature key to prove authenticity of the first device to the verifier that the first device is a member of the trusted membership group without disclosing the unique identification information;
sending a first message comprising at least a key-exchange-protocol public key computed based on a first random value, wherein the first random value is selected;
generating a session key and a message authentication code (MAC) key based at least on a shared value, wherein the MAC key is used to verify a first public key certificate associated with the remote entity;
verifying, by using the MAC key, a first public key certificate associated with the remote entity;
computing, based on a random value, a DH public key associated with the remote entity;
computing a shared value based on the random number and a DH public key associated with the first device retrievable from the first message;
secure erasing, the random value; and
generating, by using a remote entity private key, a first digital signature based at least on combined public keys, wherein the combined public keys include the DH public key associated with the remote entity and the DH public key associated with the first device; and sending a second message comprising at least the first digital signature and the MAC.

10. The method of claim 9, further comprising:
receiving a third message from the first device; verifying, by using the MAC key, a DAA-based public key retrievable from the third message; and
verifying at least, by using the DAA-based public key, a DAA-based signature from the third message.

11. The method of claim 10, wherein the remote entity is a server acting as a verifier, wherein the first message further includes a group ID (GID), wherein the MAC in the second message is generated further based on a signature-based revocation list, wherein the DAA-based signature in the third message further includes non-revoked proof, further comprising determining whether or not the first device is revoked from a trusted membership based at least on the revocation list and the non-revoked proof.

12. The method of claim 10, wherein the remote entity is a second device, wherein the first message further includes a basename associated with the first device, wherein the first digital signature is a DAA-based signature generated by using a DAA-based private key associated with the second device, wherein the first and the second devices authenticate to each other anonymously.

13. The method of claim 10, wherein the first random value is an ephemeral DH private key associated with the remote entity.

14. An apparatus comprising:
a memory to store cryptographic information from an issuer;
a digital signature logic to generate digital signatures;
a direct anonymous attestation module (DAA) to convince a verifier that the DAA possess cryptographic information from an issuer of a trusted membership group without disclosure of any unique identification information associated with the apparatus, wherein the DAA is operable to:
initiate a two-way mutual authentication between a first device and a remote entity, wherein the first device remains anonymous to the remote entity after performing the authentication;
establish a mutually shared session key based on random values from the first device and the remote entity for use in secure communication, wherein the initiating and the establishing are in conjunction with the DAA, wherein the DAA to convince a verifier that the DAA possess uncompromised cryptographic information from an issuer of a trusted membership group without disclosure of any unique identification information associated with the first device, wherein the DAA includes a unique group membership certificate and a private member key to provide a private unique signature key to prove authenticity of the first device to the verifier that the first device is a member of the trusted membership group without disclosing the unique identification information;
send a first message comprising at least a key-exchange-protocol public key computed based on a first random value, wherein the first random value is selected;
generate a session key and a message authentication code (MAC) key based at least on a shared value, wherein the MAC key is used to verify a first public key certificate associated with the remote entity;
verify, by using the MAC key, a first public key certificate associated with the remote entity;
compute, based on a random value, a DH public key associated with the remote entity;

compute a shared value based on the random number and a DH public key associated with the first device retrievable from the first message;

secure erasing, the random value; and generate, by using a remote entity private key, a first digital signature based at least on combined public keys, wherein the combined public keys include the DH public key associated with the remote entity and the DH public key associated with the first device; and sending a second message comprising at least the first digital signature and the MAC.

15. The apparatus of claim 14, wherein the remote entity comprises a server acting as the verifier, wherein the DAA is further operable to:

authenticate a first digital signature from a second message based on combined public keys retrievable from the first digital signature, wherein the first digital signature is associated with the remote entity and is retrievable by using a public key from the first public key certificate;

generate, by using a DAA-based private key, a DAA-based signature based on the combined public keys; and send a third message comprising at least the DAA-based signature, wherein the first message further includes a group ID (GID), wherein the DAA-based signature in the third message is generated further based on a signature-based revocation list and includes a non-revoked proof.

16. The apparatus of claim 14, wherein the remote entity is a second device, wherein the first message further includes a basename associated with the first device, wherein the first digital signature is a DAA-based signature generated in conjunction with a DAA-based private key associated with the second device.

17. An article of manufacture comprising a non-transitory computer readable storage medium including data storing instructions thereon that, when accessed by a machine, cause the machine to perform a method comprising:

initiating mutual authentication between a first device and a remote entity, wherein the first device remains anonymous to the remote entity after performing the authentication;

establishing a mutually shared session key based on random values from the first device and the remote entity for use in secure communication, wherein the initiating and the establishing are in conjunction with direct anonymous attestation (DAA), wherein the DAA to convince a verifier that the DAA possess uncompromised cryptographic information from an issuer of a trusted membership group without disclosure of any unique identification information associated with the first device, wherein the DAA includes a unique group membership certificate and a private member key to provide a private unique signature key to prove authenticity of the first device to the verifier that the first device is a member of the trusted membership group without disclosing the unique identification information;

sending a first message comprising at least a key-exchange-protocol public key computed based on a first random value, wherein the first random value is selected;

generating a session key and a message authentication code (MAC) key based at least on a shared value, wherein the MAC key is used to verify a first public key certificate associated with the remote entity;

verifying, by using the MAC key, a first public key certificate associated with the remote entity;

computing, based on a random value, a DH public key associated with the remote entity;

computing a shared value based on the random number and a DH public key associated with the first device retrievable from the first message;

secure erasing, the random value; and generating, by using a remote entity private key, a first digital signature based at least on combined public keys, wherein the combined public keys include the DH public key associated with the remote entity and the DH public key associated with the first device; and sending a second message comprising at least the first digital signature and the MAC.

18. The article of claim 17, wherein the method further comprising:

computing, in response to receiving a second message, a shared value based on the first random value and a second key-exchange-protocol public key associated with the remote entity;

authenticating a first digital signature from the second message based on combined public keys retrievable from the first digital signature, wherein the first digital signature is associated with the remote entity and is retrievable by using a public key from the first public key certificate; and generating, by using a DAA-based private key, a DAA-based signature based on the combined public keys; and sending a third message comprising at least the DAA-based signature.

19. The article of claim 18, wherein the remote entity is a verifier, wherein the first message further includes a group ID (GID), wherein the DAA-based signature in the third message is generated further based on a signature-based revocation list and includes non-revoked proof.

20. The article of claim 18, wherein the remote entity is a second peer device, wherein the first message further includes a basename associated with the first device, wherein the first digital signature is a DAA-based signature generated by using a DAA-based private key associated with the second device.

* * * * *